Aug. 5, 1958     J. GABORSKY, JR     2,845,731
DISPLAY DEVICE
Filed Aug. 31, 1956     2 Sheets-Sheet 1
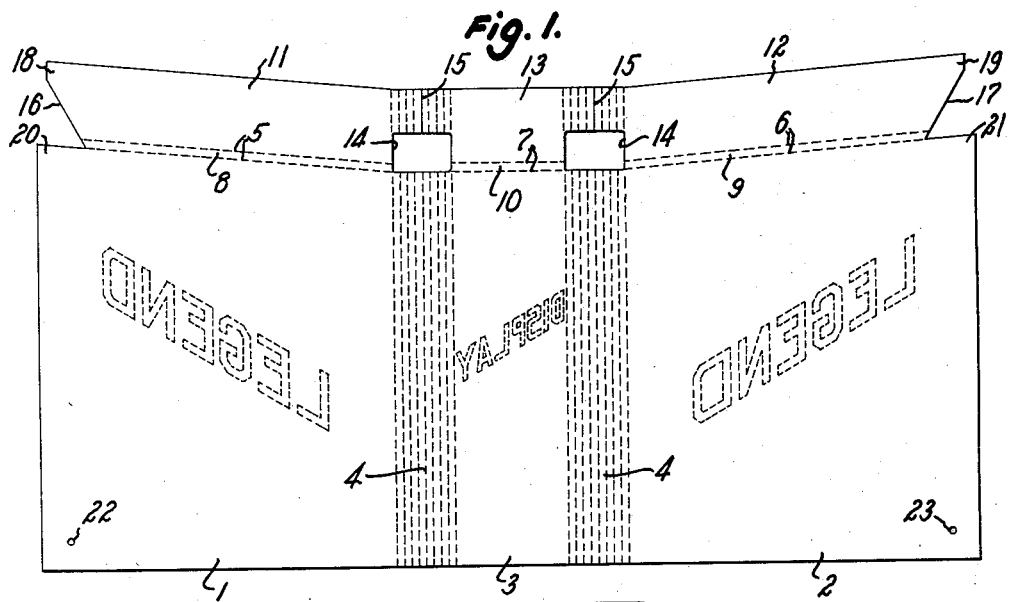
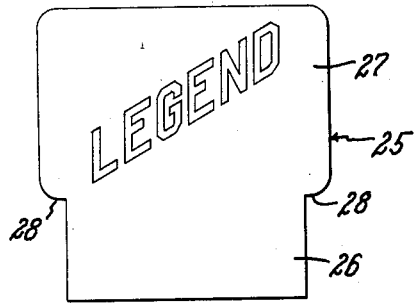
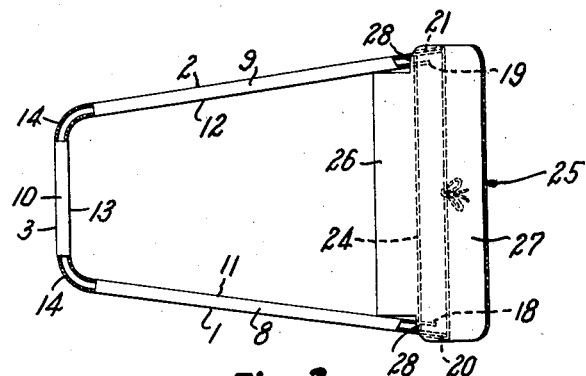
INVENTOR.
Joseph Gaborsky, Jr.

Aug. 5, 1958  J. GABORSKY, JR  2,845,731
DISPLAY DEVICE
Filed Aug. 31, 1956  2 Sheets-Sheet 2
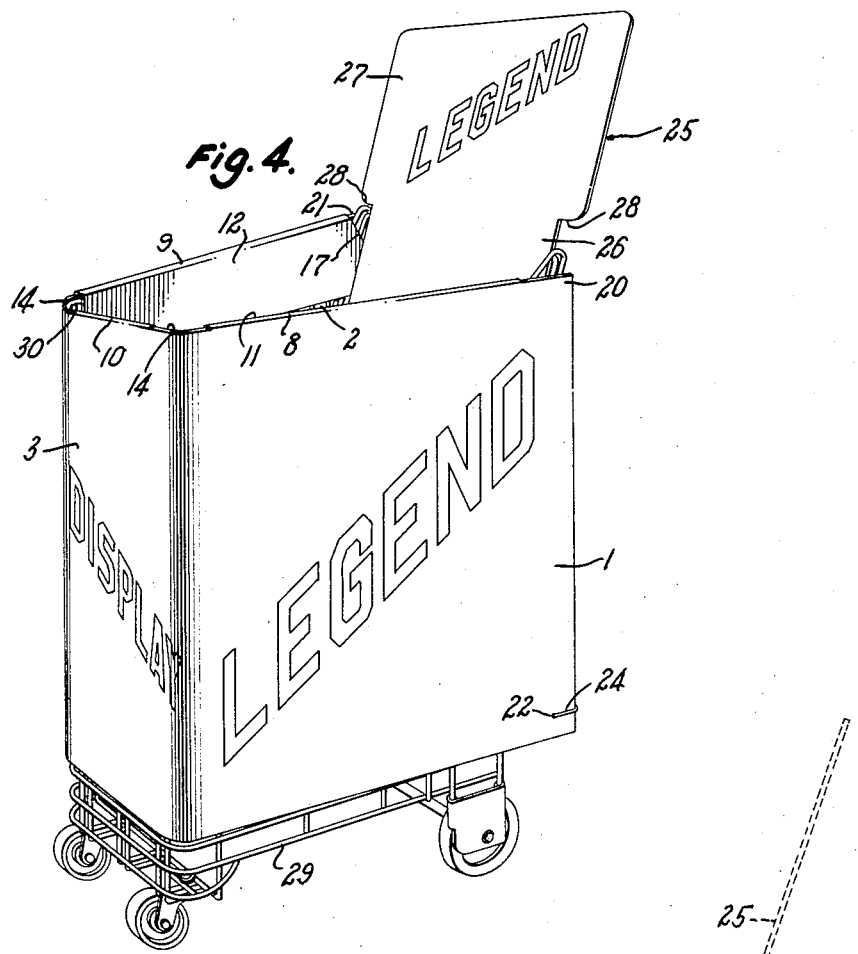
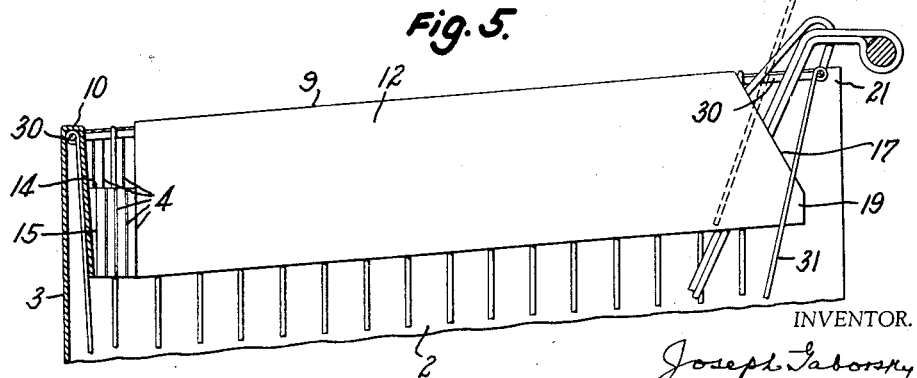
INVENTOR.
Joseph Gaborsky, Jr.
BY
atty.

United States Patent Office 2,845,731
Patented Aug. 5, 1958

2,845,731

DISPLAY DEVICE

Joseph Gaborsky, Jr., Wadsworth, Ohio, assignor to The Ohio Boxboard Company, Rittman, Ohio, a corporation of Ohio Application August 31, 1956, Serial No. 607,390

9 Claims. (Cl. 40—125)

This invention relates to display devices, and it has particular reference to a display device which may be applied to a self-service shopping cart of the type now generally in use in the so-called supermarkets.

The primary object of the invention is to provide a display device which, although of relatively inexpensive form, will provide large panel surfaces for the reception and presentation of printed, or otherwise applied, advertising legends and displays.

A further object is to provide a display device which may easily be applied to a cart of the character described and which is applicable, within predetermined limits, to carts of different shapes and sizes and which serves to substantially fully conceal the cart structure by the arrangement of its panels which carry the advertising legends and displays.

A cart with the display device applied thereto is intended not for use by a shopper in transporting the articles selected for purchase, though it might, conceivably, be so used, but to contain a complement of the articles of merchandise advertised by its displays and legends and to be stationed in such position in the market as to attract the attention of customers to the commodity displayed. Thus it will be of value to the merchant in calling attention to a particular product such as a newly introduced item or one upon which a special sales promotion drive is under way, thus serving not only the merchant but also the producers whose products he carries in stock.

With these and other objects and advantages in mind, the invention comprises a display device comprising a sheet of paperboard material, such, preferably, as corrugated board, cut to a size and shape to cover the front end and sides of a self-service shopping cart and provided with folding scores which define front and side panels of variable size to accommodate it to carts of various lateral dimensions, and having at its upper edges foldable flaps or extensions defined from its front and side panel portions by appropriately arranged cuts and folding scores and adapted to be folded over the upper edges of the basket portion of the cart and down into such basket portion against, or in proximity to, the inner faces of the walls thereof to form a support or suspension means for the display device upon the cart, the rear, free edges of the side panels being retained in cart side embracing position by a tie cord passed through holes provided adjacent to such free edges and in proximity to the bottom edges of the side panels. The invention also provides a placard, on which a display or legend may appear, for arrangement at the rear wall of the cart basket, all as will be explained hereinafter more fully and finally claimed.

In the accompanying drawings illustrating the invention, in the several figures of which like parts are similarly designated, Fig. 1 is a plan view of the inner side of the blank from which the body of the display device is formed, Fig. 2 is a face view of the separate display placard, Fig. 3 is a top plan view of the parts of the display device in the assembled form they would take when applied to a self-service market cart, but omitting any showing of such a cart, Fig. 4 is a perspective view of the display device assembled upon a self-service market cart, and Fig. 5 is a fragmentary longitudinal sectional elevation of the body member of the display device mounted upon a self-service market cart, with the separate display placard shown in broken lines.

Having reference particularly to Fig. 1, it will be seen that the blank from which the body member of the display device is formed comprises similar side panel members 1 and 2 and a front panel member 3 which is defined from the side panel members by two series or multiples of parallel folding scores 4 which not only make the device adaptable to the baskets of self-service market carts of various widths but serve also to readily accommodate the portions between the front panel member 3 and the two side panel members 1 and 2 to the generally curved contour of the front corners of the cart basket.

At the upper edges of the blank, pairs of parallel folding scores 5, 6 and 7 define from the side panel members 1 and 2 and the front panel member 3, respectively, foldable top edge members 8, 9 and 10 and flap extensions 11, 12 and 13. Also, in the zones of the multiple parallel folding scores 4, 4, those portions of the blank constituting the top edge members 8, 9 and 10 and the flap extensions 11, 12 and 13 are formed with cut-outs providing rectangular openings 14 which serve to facilitate conformation of the corner portions of the blank to the corners of the front end of the cart basket when the display device is applied thereto. Also, those corner portions above the openings 14 are formed with medial cuts 15 which permit separation of the flap extensions 11, 12 and 13 when they are relatively folded inwardly over the upper edges of the cart basket during assembly of the display device upon the cart.

The free end edges of the flap extensions 11 and 12 of the side panel members are cut back diagonally as at 16 and 17, respectively, to provide locating tongues 18 and 19 at their ends for a purpose later to be described, and to provide free portions 20 and 21 at the upper edges of the side panel members to clear normal obstructions at the sides of the cart basket and extend smoothly against such sides.

Adjacent to its lower free corners each of the side panels 1 and 2 is provided with an opening 22, 23 to receive a retaining cord 24 (Figs. 3 and 4) which serves to hold the lower edges of the display device in properly adjusted location with respect to adjacent portions of the cart frame.

The separate display placard 25 (Fig. 2) is merely a flat card of corrugated board, the lower portion 26 of which is preferably of less width than its upper portion 27 so as to make its width substantially conform to the width of the rear portion of the cart basket with the body of the display device applied thereto (Figs. 3 and 4) in order that the display placard may be frictionally held in proper association therewith. Moreover, this difference in width between the upper and lower portions 27 and 26 of the placard 25 provides shoulders 28 which will, when necessary, limit insertion of the placard into the basket of the cart.

As shown in Figs. 3 to 5, and particularly in Figs. 4 and 5, assembly of the body of the display device upon the market cart 29 is accomplished by wrapping it around the front and sides of the cart, tying the cord 24 passed through the openings 22 and 23 in the side panel members, and folding the foldable flap extensions 11, 12 and 13 upon the folding scores 5, 6 and 7 so that the top edge members 8, 9 and 10 properly overlie the top rim member 30 (Figs. 4 and 5) of the cart basket and the flap extensions 11, 12 and 13 lie against or in proximity to the inner faces of the side and front walls of the basket. The flap extensions 11 and 12 of the side panel members 1 and 2 are secured in this assembled condition by passing, or snapping, their locating tongues 18 and 19, respectively, in back of, and hence springily in contact with, adjacent vertical wires 31 (Fig. 5) at the rear wall of the cart basket, and the flap extension 13 of the front panel members 3 is retained in position by reengagement of its vertical edges of the cuts 15 (Fig. 5).

With the body of the display device thus assembled upon the market cart, the separate placard 25 will be properly positioned (Figs. 3, 4 and 5) with the side edges of its portion 26 of less width in frictional engagement with the rearwardly extending portions of the flap extensions 11 and 12.

The parts of the display device having been thus assembled upon the cart, the basket of the cart may be appropriately loaded with the packages or articles to be displayed and the product or nature of which are advertised by the legends and displays borne by the side and front panels of the body member and the separate placard; the thus furnished cart then being placed in a location in the market or store where it will attract and hold the attention of customers.

Various changes and modifications are considered to be within the principle of the invention and the scope of the following claims.

What I claim is:

1. A display device primarily adapted for use with a self-service basket type market cart, having a body formed from a sheet of paperboard material and including a front panel member and two side panel members for exterior wrap-around application to the front and sides of the cart, respectively, and flap extensions at the upper portions of the side panel members for suspending said panel members upon the upper edges of the side walls of the cart basket.

2. A display device primarily adpated for use with a self-service basket type market cart, having a body formed from a sheet of paperboard material and including a front panel member and two side panel members for exterior wrap-around application to the front and sides of the cart, respectively, and flap extensions at the upper portions of the front and side panel members for suspending said panel members upon the upper edges of the front and side walls of the cart basket.

3. A display device as claimed in claim 1, in which the suspending flap extensions are of sufficient length to be folded over the upper edges of the side walls of the cart basket and extend downwardly within such basket in substantial juxaposition to the inner faces of such walls.

4. A display device as claimed in claim 2, in which the suspending flap extensions are of sufficient length to be folded over the upper edges of the front and side walls of the cart basket and extend downwardly within such basket in substantial juxaposition to the inner faces of such walls.

5. A display device as claimed in claim 1, in which the flap extensions of said side panel members are provided with rearwardly projecting locating tongues for engagement with members of the cart located in proximity to the rear wall of the cart basket.

6. A display device as claimed in claim 1, in which the front panel member of the body is defined from the side panel members thereof by parallel series of relatively spaced parallel folding scores which serve to accommodate the body to market carts of different widths and market carts in which the front and sides of their baskets are joined by curved top edge members.

7. A display device as claimed in claim 1, in which the rear edges of the side panel members are fastened in embracing relation to the sides of the market cart by tie means spanning the rear end of the cart.

8. A display device as claimed in claim 1, including a separate placard member for insertion into the basket of the market cart in frictional engagement with parts of the body of the display device.

9. A display device as claimed in claim 1, including a separate placard member for insertion into the basket of the market cart in frictional engagement with the flap extensions of the side panel members of the body of the display device.

References Cited in the file of this patent

UNITED STATES PATENTS

| | | |
|---|---|---|
| 1,196,863 | Heusner | Sept. 5, 1916 |
| 1,557,332 | Robbins | Oct. 13, 1925 |
| 2,166,048 | Fritsch | July 11, 1939 |
| 2,456,817 | Davenport | Dec. 21, 1948 |
| 2,687,589 | Borckway | Aug. 31, 1954 |
| 2,723,474 | Minter | Nov. 15, 1955 |